Patented Apr. 7, 1931

1,799,349

UNITED STATES PATENT OFFICE

WILLIAM J. BANNISTER, OF TERRE HAUTE, INDIANA, ASSIGNOR TO COMMERCIAL SOLVENTS CORPORATION, OF TERRE HAUTE, INDIANA, A CORPORATION OF MARYLAND

PRODUCTION OF TRIALKYL PHOSPHATES

No Drawing. Application filed November 18, 1929. Serial No. 408,163.

The present invention relates to a method of producing alkyl phosphates. More particularly, it relates to a method of producing alkyl phosphates by the interaction of aluminium alkoxides and phosphorus oxychloride.

In the past it has been the custom to prepare simple and mixed alkyl phosphates, such as tributyl phosphate, diethyl propyl phosphate, butyl dipropyl phosphate, etc. by treating the sodium alkoxides with phosphorus oxychloride in dry ether or benzol. This method, however, possesses certain inherent defects which makes it decidedly less satisfactory for large-scale use than that which is about to be disclosed.

In order to prepare alkyl phosphates by my new method it is first necessary to obtain the aluminium alkoxide corresponding to the alkyl phosphate to be produced, as for example, aluminium ethoxide, aluminium butoxide, etc. The required aluminium alkoxide may in general be prepared according to some such method as that disclosed in German Patents Nos. 286,596 and 293,613; according to which alcohols are allowed to act on aluminium metal in the presence of very small amounts of mercury as a catalyst. This method may best be illustrated by the following example.

Into a one liter beaker are weighed 120 grams of aluminium in the form of fine granules. To this are then added about 100 c. c. of 4% to 5% aqueous sodium hydroxide solution, and the resulting mixture is well shaken. In about a minute after reaction has started, as indicated by foaming, the aqueous solution is carefully decanted off and the aluminium washed with distilled water until the wash water is no longer alkaline to brilliant yellow test paper. The aluminium is then dried by washing three times with 200 c. c. of acetone, being transferred to a five liter round-bottomed flask during the last washing operation. After decanting as much of the acetone as possible, the remainder is removed by heating the flask under a vacuum in a hot water bath.

After ridding the aluminium of oxide, grease and other impurities by the above treatment and thus allowing it to react more favorably with the alcohol, three thousand eight hundred cubic centimeters of substantially anhydrous butanol are added to the flask containing the dry metal. Finally, 2.0 grams of mercuric chloride are added to act as a catalyst, and the flask is shaken. The reaction generally starts at once, but, if necessary, it may be accelerated by heating until the temperature is about 60° C. The reaction then proceeds by itself, being highly exothermic. If the reaction should become too vigorous it will be necessary to slow it down by running cooling water over the outside of the flask. A reflux condenser should be provided for the return of butanol to the reaction flask and suitable arrangements should be made for the removal of the hydrogen liberated during the reaction.

When the reaction is completed the resulting liquid is separted from the residue and distilled to remove the excess butanol. When the temperature reaches 150° C., the distillation is continued under vacuum until the liquid temperature is 200°–220° C. The residue remaining in the distillation flask and consisting of practically pure aluminium butoxide is allowed to cool. When the temperature of the material has fallen to about 80° C., 1,700 c. c. of C. P. benzol are added, and the aluminium butoxide (approximately 1,000 grams), which has become semi-solid, is put into solution by shaking.

The aluminium butoxide, prepared as above described or by any other method, is used for the preparation of tributyl phosphate substantially as follows. The flask containing a benzol solution of approximately 1,000 grams of aluminium butoxide is placed in a salt-ice or other suitable freezing bath and the temperature of the solution brought down, while agitating, to about 5° to 8° C. There is then added slowly a benzol solution of the theoretical amount of phosphorus oxychloride (624 grams of phosphorus oxychloride dissolved in 800 c. c. of C. P. benzol). The rate of addition should be governed by the temperature, care being taken that the latter does not rise preferably above about 15° C. When all of the phosphorus oxychloride has been added the temperature of the reaction mixture is allowed to rise slowly to room temperature while thoroughly agitating the mixture. Chipped ice is then slowly added to the reaction mixture, care being taken not to add ice at such a rate as to cause a too rapid rise of the temperature and consequent loss of the material by boiling. Water may be added instead of ice to hydrolyze the aluminium chloride and unused phosphorus oxychloride, if desired, but it must be added very slowly and the reaction mixture must be well cooled. When finally the maximum temperature has been reached and the mixture cooled to room temperature by the addition of more ice, the mixture is transferred to a separatory funnel where the aqueous layer is drawn off and discarded. Any aluminium hydroxide formed by the hydrolysis of the aluminium chloride may be removed by filtration, if necessary, to give a clear separation of the water and solvent layers. The solvent layer is then washed several times with equal volumes of water until the wash water is no longer acid to Congo red test paper. This is followed by a wash with 100 c. c. of 5% sodium hydroxide solution and finally by a 500 c. c. water wash. The resulting neutral benzol solution is then distilled, at first under atmospheric pressure to remove the greater portion of the benzol and then under a good vacuum. Under 15 mm. pressure very little distillate comes over below 170° C. where a cut is made. The fraction containing tributyl phosphate comes over from 170° to 185° C., most of it distilling at 170°–174° C. A yield of approximately 90% of the theoretical based upon the phosphorus oxychloride used is obtained.

The preparation of tributyl or other trialkyl phosphate by the method disclosed above has a number of distinct advantages over methods previously employed and particularly that comprising the use of sodium alkoxide and phosphorus oxychloride. With sodium butoxide a yield of only 45%–50% of the theoretical amount of tributyl phosphate, based upon the phosphorus oxychloride used is obtained, as compared to approximately 85%–90% when using aluminium butoxide.

In preparing sodium butoxide, it is difficult to obtain a product free from butanol. A large excess of butanol must be used to put all of the metallic sodium in solution, and if the resultant solution is evaporated down by aid of heat, tar-like materials are formed and charring occurs. The alternative method of adding a hydrocarbon such as benzol or toluol to the solution and then boiling off the butanol in a constant boiling mixture is very impractical also due to the low proportion of butanol in the distillate and also to the fact that sodium butoxide is not soluble in the hydrocarbons. Therefore, the sodium butoxide always contains a large amount of butanol when it is reacted with phosphorus oxychloride, resulting in the formation of a mixture of esters instead of substantially only the trialkyl phosphate as is the case when aluminium alkoxide is used.

Aluminium alkoxides differ from sodium alkoxides in that they are unaffected by heat. They can, in fact, generally be distilled under vacuum. Hence there is little or no difficulty in ridding them of the alcohols used in their formation. Furthermore, they are easily soluble in benzol, etc., and the esterification can be conducted in a homogeneous phase.

Due to the difference in the amounts of metals used in preparing the corresponding alkoxides, a distinct saving is effected by using the aluminium compounds. Added to such advantages is the fact that a simpler operating technique is possible when using aluminium alkoxides. Furthermore, the use of both aluminium and aluminium alkoxides is much less hazardous than is the case when sodium and sodium alkoxides are used. Aluminium alkoxides and their hydrolysis products are not corrosive to the skin, whereas it is well known that sodium hydroxide and sodium alkoxides are extremely corrosive.

In the specific example set forth above only the preparation of tributyl phosphate has been described. It is distinctly understood, however, the invention is not limited to the preparation of only this compound. It is desired to include also under the concept of my invention the preparation of other trialkyl phosphates, as for example, triamyl phosphate, tripropyl phosphate, triethyl phosphate, etc. It is also distinctly understood that I do not limit myself to the exact procedure set forth above but may vary the operation and technique in the usual manner familiar to one skilled in the art. For example, instead of using benzol as the solvent for the alkoxide, I may use other hydrocarbons such as toluol or xylol or any other suitable solvent having the required boiling point.

In the specific example it has been recommended that the reaction temperature be maintained below about 15° C. It is distinctly understood, however, that the process is not limited to the use of this specific temperature, it being possible to use satisfactorily, considerably higher temperatures, say 40° C., provided the phosphorus oxychloride is added at a sufficiently slow rate so as to prevent the reaction from taking place too quickly and consequently getting beyond control.

Now having described my invention, what I desire to claim as new and novel is:

1. In a process for the production of trialkyl phosphates, the step which comprises reacting aluminium alkoxide with phosphorus oxychloride.

2. In a process for the production of trialkyl phosphates, the step which comprises slowly adding a hydrocarbon solution of phosphorus oxychloride to a hydrocarbon solution of aluminium alkoxide while maintaining the temperature of the reaction mixture below about 15° C.

3. In a process for the production of trialkyl phosphates, the step which comprises slowly adding a hydrocarbon solution of phosphorus oxychloride to a hydrocarbon solution of aluminium alkoxide while agitating and maintaining the temperature of the reaction mixture below about 15° C.

4. In a process for the production of trialkyl phosphates, the step which comprises slowly adding a benzol solution of phosphorus oxychloride to a benzol solution of aluminium alkoxide while maintaining the temperature of the reaction mixture below about 15° C.

5. In a process for the production of trialkyl phosphates, the step which comprises slowly adding a hydrocarbon solution of phosphorus oxychloride to a hydrocarbon solution of aluminium alkoxide while maintaining the temperature of the reaction mixture below about 15° C., then slowly adding sufficient water to hydrolyze any aluminium chloride and phosphorus oxychloride present while regulating the temperature of the reaction mixture.

6. In a process for the production of trialkyl phosphates, the steps which comprise slowly adding a benzol solution of phosphorus oxychloride to a benzol solution of aluminium alkoxide while maintaining the temperature of the reaction mixture below about 15° C., then slowly adding sufficient water to hydrolyze any aluminium chloride and phosphorus oxychloride present while regulating the temperature of the reaction mixture, and finally removing the water and recovering the trialkyl phosphates by fractional distillation.

7. In a process for the production of tributyl phosphates, the step which comprises reacting aluminium butoxide with phosphorus oxychloride.

8. In a process for the production of tributyl phosphates, the step which comprises slowly adding a hydrocarbon solution of phosphorus oxychloride to a hydrocarbon solution of aluminium butoxide while maintaining the temperature of the reaction mixture below about 15° C.

9. In a process for the production of tributyl phosphates, the step which comprises slowly adding a hydrocarbon solution of phosphorus oxychloride to a hydrocarbon solution of aluminium butoxide while agitating and maintaining the temperature of the reaction mixture below about 15° C.

10. In a process for the production of tributyl phosphates, the step which comprises slowly adding a benzol solution of phosphorus oxychloride to a benzol solution of aluminium butoxide while maintaining the temperature of the reaction mixture below about 15° C.

11. In a process for the production of tributyl phosphates, the step which comprises slowly adding a hydrocarbon solution of phosphorus oxychloride to a hydrocarbon solution of aluminium butoxide while maintaining the temperature of the reaction mixture below about 15° C., then slowly adding sufficient water to hydrolyze any aluminium chloride and phosphorus oxychloride present while regulating the temperature of the reaction mixture.

12. In a process for the production of tributyl phosphates, the steps which comprise slowly adding a benzol solution of phosphorus oxychloride to a benzol solution of aluminium butoxide while maintaining the temperature of the reaction mixture below about 15° C., then slowly adding sufficient water to hydrolize any aluminium chloride and phosphorus oxychloride present while regulating the temperature of the reaction mixture, and recovering the tributyl phosphates by fractional distillation.

In testimony whereof I affix my signature.

WILLIAM J. BANNISTER.